United States Patent
Bourcier et al.

(10) Patent No.: US 9,821,287 B2
(45) Date of Patent: Nov. 21, 2017

(54) SYSTEMS FOR PRODUCTION OF POLYMER ENCAPSUATED SOLIDS

(71) Applicants: William L. Bourcier, Livermore, CA (US); Roger D. Aines, Livermore, CA (US); Sarah E. Baker, Dublin, CA (US); Eric B. Duoss, Dublin, CA (US); Amitesh Maiti, San Ramon, CA (US); Jeffery J. Roberts, Livermore, CA (US); Christopher M. Spadaccini, Oakland, CA (US); Joshuah K. Stolaroff, Oakland, CA (US); John J. Vericella, Oakland, CA (US); Jennifer A. Lewis, Cambridge, MA (US); James O. Hardin, IV, Nevils, GA (US); William C. Floyd, III, Oakland, CA (US)

(72) Inventors: William L. Bourcier, Livermore, CA (US); Roger D. Aines, Livermore, CA (US); Sarah E. Baker, Dublin, CA (US); Eric B. Duoss, Dublin, CA (US); Amitesh Maiti, San Ramon, CA (US); Jeffery J. Roberts, Livermore, CA (US); Christopher M. Spadaccini, Oakland, CA (US); Joshuah K. Stolaroff, Oakland, CA (US); John J. Vericella, Oakland, CA (US); Jennifer A. Lewis, Cambridge, MA (US); James O. Hardin, IV, Nevils, GA (US); William C. Floyd, III, Oakland, CA (US)

(73) Assignees: Lawrence Livermore National Security, LLC, Livermore, CA (US); The Board of Trustees of the University of Illinois, Urbana, IL (US)

( * ) Notice: Subject to any disclaimer, the term of this patent is extended or adjusted under 35 U.S.C. 154(b) by 788 days.

(21) Appl. No.: 14/066,503

(22) Filed: Oct. 29, 2013

(65) Prior Publication Data
US 2015/0115487 A1    Apr. 30, 2015

(51) Int. Cl.
*B05D 5/08* (2006.01)
*B01J 13/00* (2006.01)
(Continued)

(52) U.S. Cl.
CPC ............. *B01J 13/00* (2013.01); *B01J 13/04* (2013.01); *B01J 13/12* (2013.01)

(58) Field of Classification Search
CPC ... B01J 13/00; B01J 13/12; B01J 13/04; B01J 13/206; B01J 13/20
See application file for complete search history.

(56) References Cited

U.S. PATENT DOCUMENTS 4,474,033 A * 10/1984 Baker ............... A61J 1/165
    62/457.2
5,053,461 A * 10/1991 Tone ............... C08F 265/06
    525/243
(Continued)

*Primary Examiner* — Galen Hauth
(74) *Attorney, Agent, or Firm* — Eddie E. Scott

(57) ABSTRACT

Encapsulated solids are made by first encapsulating precursor materials in a polymer shell. The precursors are some combination of solids, liquids, gases, and/or gels. The precursors are then transformed into solids by emplacement of the capsule in an environment where gas or fluid transport into or out of the polymer shell causes transformation into solids.

2 Claims, 3 Drawing Sheets

(51) Int. Cl.
*B01J 13/04* (2006.01)
*B01J 13/12* (2006.01)

(56) References Cited

U.S. PATENT DOCUMENTS

| | | | |
|---|---|---|---|
| 5,681,601 A * | 10/1997 | Hendrick | A23D 9/05 426/804 |
| 6,780,507 B2 | 8/2004 | Toreki et al. | |
| 2003/0013783 A1 * | 1/2003 | Kommareddi | B01J 13/04 523/175 |
| 2011/0117622 A1 * | 5/2011 | Yoshikado | A61K 9/4883 435/180 |
| 2012/0156606 A1 * | 6/2012 | Vanbesien | G03G 9/0823 430/108.2 |
| 2012/0214219 A1 | 8/2012 | Aines et al. | |
| 2014/0147510 A1 * | 5/2014 | Lahann | A61K 9/14 424/501 |

* cited by examiner

SYSTEMS FOR PRODUCTION OF POLYMER ENCAPSUATED SOLIDS

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to encapsulation and more particularly to systems for production of polymer encapsulated solids.

2. State of Technology

Systems for producing microcapsules are described in U.S. Pat. No. 7,776,927 and in US. Published Patent Application Nos. 2009/0012187 and 2009/0131543. U.S. Pat. No. 7,776,927 to Liang-Yin Chu et al, assigned to the President and Fellows of Harvard College, discloses emulsions and the production of emulsions, including multiple emulsions and microfluidic systems for producing multiple emulsions. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0012187 to Liang-Yin Chu et al, assigned to the President and Fellows of Harvard College, discloses multiple emulsions, and to methods and apparatuses for making emulsions, and techniques for using the same. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0131543 to David A. Weitz discloses multiple emulsions, and to methods and apparatuses for making multiple emulsions. A multiple emulsion, as used herein, describes larger droplets that contain one or more smaller droplets therein. The larger droplet or droplets may be suspended in a third fluid in some cases. In certain embodiments, emulsion degrees of nesting within the multiple emulsion are possible. For example, an emulsion may contain droplets containing smaller droplets therein, where at least some of the smaller droplets contain even smaller droplets therein, etc. Multiple emulsions can be useful for encapsulating species such as pharmaceutical agents, cells, chemicals, or the like. In some cases, one or more of the droplets (e.g., an inner droplet and/or an outer droplet) can change form, for instance, to become solidified to form a microcapsule, a lipo some, a polymero some, or a colloidosome. As described below, multiple emulsions can be formed in one step in certain embodiments, with generally precise repeatability, and can be tailored to include one, two, three, or more inner droplets within a single outer droplet (which droplets may all be nested in some cases). As used herein, the term "fluid" generally means a material in a liquid or gaseous state. Fluids, however, may also contain solids, such as suspended or colloidal particles. U.S. Pat. No. 7,776,927 and U.S. Published Patent Application Nos. 2009/0012187 and 2009/0131543 are incorporated herein by this reference.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for making coated capsules containing materials used for different applications. The present invention has use where it is important to control material reactivity, material size distribution, material surface area, and to be able to trigger material release via a triggering event that enables enhanced transport through the shell (e.g. bursting of the shell, or an increase in permeability due to temperature). The present invention can be used to encapsulate solid materials that would ordinarily require special handling, or be unavailable for applications where their reactivity without encapsulation prohibits transport to the point of use.

In one embodiment the present invention provides a system wherein encapsulated solids are made by first encapsulating precursor materials in a polymer shell. The precursors are some combination of solids, liquids, gases, and/or gels. The precursors are then transformed into solids by emplacement of the capsule in an environment where gas or fluid transport into or out of the polymer shell causes transformation into solids. For example vacuum dehydration of a concentrated sodium carbonate solution results in a polymer-coated sodium carbonate solid, an ionic crystal. Analogously, water diffusion into a capsule of anhydrous solids will produce a hydrated solid that may be useful due to a significant volume increase.

One embodiment of an apparatus of the present invention includes an injection tube, a collection tube, an outer tube, an inner fluid of precursor material, a middle fluid encapsulation material, and a droplet forming nozzle. The operation of the system will now be considered. The inner fluid of precursor material flows into the droplet forming nozzle producing droplets of precursor material. The middle fluid of encapsulation flows in the outer tube around the droplets. The droplets of precursor materials become encased in the middle fluid of encapsulation material forming microcapsules that have the precursor material contained in an outer shell. The outer fluid flows in the outer tube and helps form a boundary layer and also flows through the collection tube. This outer fluid carries the fabricated microcapsules through the collection tube. A boundary layer between the middle fluid and the outer fluid helps direct the droplets of precursor materials into the collection tube and helps produce the outer shell. Each capsule includes a coating of the encapsulation material and the precursor material encapsulated within the coating. The precursors are then transformed into solids by emplacement of the capsule in an environment where gas or fluid transport into or out of the polymer shell causes transformation into solids.

The precursor materials encapsulated within the capsule can be any or a mixture of precursor materials. For example, the polymer coating can be used to encapsulate solid materials that would ordinarily require special handling, or be unavailable for applications where their reactivity without encapsulation prohibits transport to the point of use.

In various embodiments, encapsulated solids are made by first encapsulating precursor materials in a polymer shell. The precursors can be some combination of solids, liquids, gases, and gels. The precursors are then transformed into solids by emplacement in an environment where gas or fluid transport into or out of the polymer shell causes transformation into solids, at a rate that is controlled by adjusting the composition of the medium into which the capsule is placed. For example, alkoxide solution, such as those of titanium or silica, can be encapsulated. If the encapsulated alkoxide solutions are placed into pure water, the water will diffuse into the capsule and exchange with the alcohol present, resulting in rapid crystallization of relatively small crystals of titania or silica. However, the size of the crystals can be controlled by immersing the capsule into a mixed solvent of water and an organic solvent, instead of pure water. The mixture slows the rate of solvent exchange because of the lower water content of the mixed solvent. The lower rate of water transport into the capsule results in slower growth of fewer but larger crystals of titanium oxide, which is a favorable result if high compressive strength and large size of the crystals is the desired outcome.

In various embodiments, the present invention can encapsulate a variety of solids for which encapsulation protects the solids, prevents reaction, and allows transport to remote locations where the solids can be released via a triggering event that denatures or bursts the encapsulating polymer. For example, many high explosives are precipitated from solvents. The high explosive precipitate must possess a specific crystallite size and pore size distribution in order to maximize explosive power. An application of the present invention is to load capsules with solvents containing high explosive and then allow solvent loss to result in crystallization of the high explosive in the capsule with the appropriate properties for use. For example, we have shown that a nearly-saturated solution of pentaerythritol can be encapsulated. If placed into a glycerol solution, water leaves the capsule and enters the glycerol phase, resulting in crystallization of pentaerythritol, a molecular crystal, inside the capsule. Encapsulation allows them to be transported to the site of intended use without unwanted interactions along the way. For example, the encapsulated solid high explosives could be contained in fluids in the subsurface that are pumped to a desired location and used to explosively fracture rocks in fossil fuel or geothermal energy applications.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
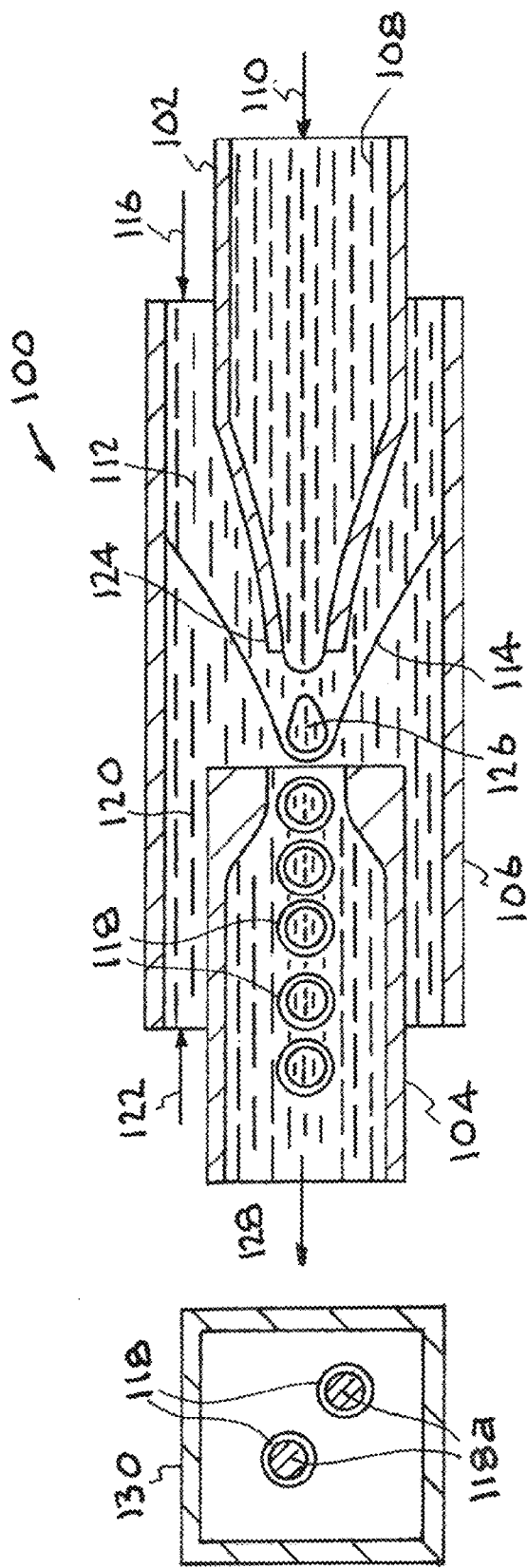
FIG. 1 illustrates a system for making polymer coated capsules.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, a system for making polymer coated capsules containing solids is illustrated. FIG. 1 illustrates one embodiment of a system and method of fabricating capsules containing precursor materials that are subsequently converted into solids. The present invention that provides encapsulation of solids by first encapsulating liquid precursors has applications where it is important to control solid reactivity, solid size distribution, solid surface area, and to be able to trigger solid release via a triggering event that enables enhanced transport through the polymer shell (e.g. bursting of the shell, or an increase in permeability due to temperature). The present invention can be used to encapsulate solid materials that would ordinarily require special handling, or be unavailable for applications where their reactivity without encapsulation prohibits transport to the point of use.

The present invention system for making capsules containing precursor materials is schematically illustrated in FIG. 1. The system is designated generally by the reference numeral 100. The system 100 includes the following items:

an injection tube 102,
a collection tube 104,
an outer tube 106,
inner fluid of precursor material 108,
middle fluid polymer encapsulation material 112,
boundary layer 114,
microcapsules containing precursor material 118,
solids with the microcapsules 118a.
outer fluid 120,
droplet forming nozzle 124, and
a vacuum dehydration unit 130.

The structural element of the system 100 having been described, the operation of the system 100 will now be considered. The inner fluid of precursor material 108 is flowing in the direction indicated by arrow 110 into the droplet forming nozzle 124. The middle fluid 112 flows in the outer tube 106 in the direction indicated by arrow 116. The droplets of precursor materials 126 become encased in the middle fluid 112 forming microcapsules 118 that have the precursor material contained in an outer shell of the middle fluid 112. The outer fluid 120 flows in the outer tube 106 in the direction indicated by arrow 122. The outer fluid 120 helps form the boundary layer 114 and also flows through the collection tube 104. This outer fluid 120 carries the fabricated microcapsules 118 through the collection tube 104 as indicated by the arrow 128. The boundary layer 124 between the middle fluid 114 and the outer fluid 120 helps direct the droplets of precursor materials 126 into the collection tube 104 and helps produce the outer shell. The fabricated microcapsules 118 are directed into a vacuum dehydration unit 130. The precursor materials are transformed into solids 118a by emplacement in an environment where gas or fluid transport into or out of the polymer shell causes transformation into solids. As illustrated in FIG. 1 the vacuum dehydration unit 130 of a concentrated sodium carbonate solution results in a polymer-coated sodium carbonate solid 118a.

Figure 2:
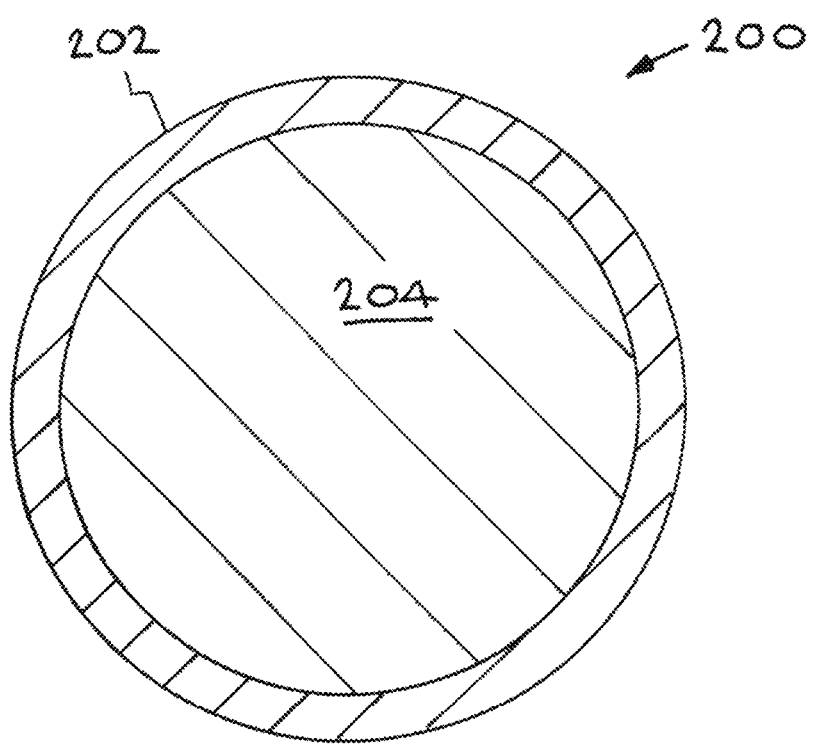
FIG. 2 illustrates one of the capsules shown in FIG. 1.

Referring now to FIG. 2, an individual receptacle is illustrated. The individual receptacle is designated generally by the reference numeral 200. The receptacle 200 includes an outer shell and a solid material 204 encapsulated within the outer 202 of the receptacle 200. The solid material 204 was produce by the fabricated microcapsules 200 containing precursor materials being directed into a vacuum dehydration unit. The precursor materials are transformed into solids 204 by emplacement in an environment where gas or fluid transport into or out of the polymer shell causes transformation into solids.

Figure 3:
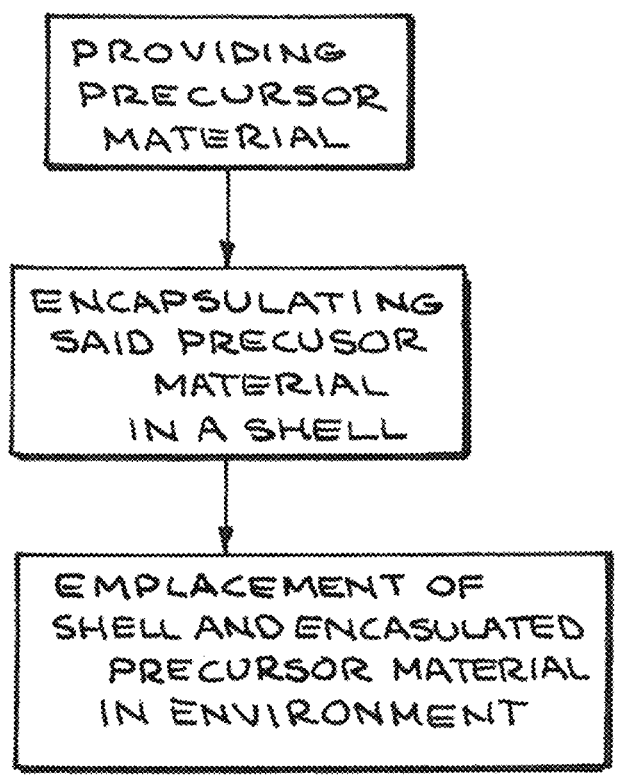
FIG. 3 is a flow chart that illustrates an embodiment of the present invention.

Referring now to FIG. 3, a flow chart illustrates a method of making a capsule containing an encapsulated material of the present invention. The steps of the method are described below.

FIG. 3 illustrates a method of making a capsule containing an encapsulated material. The method includes the steps of providing precursor material, encapsulating the precursor material in a shell, and emplacement of the shell and the encapsulated precursor material in an environment where the precursor material is transformed into a solid. The shell can be a polymer shell. The precursor material can be a liquid, gas, or gel precursor material. The encapsulated precursor material can be placed in a vacuum dehydration environment where the precursor material is transformed into a solid.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of making a capsule containing an encapsulated material, comprising the steps of:
   providing an outer tube,
   providing an injection tube inside of said outer tube,
   providing an inner fluid of precursor material in said injection tube wherein said step of providing an inner fluid of a precursor material comprises providing an inner fluid of concentrated sodium carbonate solution precursor material,
   providing a droplet forming nozzle inside of said outer tube wherein said droplet forming nozzle is connected to injection tube,
   providing a collection tube inside of said outer tube wherein said collection is positioned proximate said droplet forming nozzle,
   providing middle fluid polymer encapsulation material inside of said outer tube and outside of said injection tube and said droplet forming nozzle,
   providing outer fluid inside of said outer tube and outside of said middle fluid polymer encapsulation material wherein said outer fluid produces a boundary layer with said middle fluid polymer encapsulation material,
   moving said inner fluid of said precursor material in said injection tube and through said droplet forming nozzle producing droplets of said precursor material,
   moving said middle fluid polymer encapsulation material inside of said outer tube and inside of said outer fluid around said droplets of said precursor material encapsulating said droplets of said precursor material in a shell of middle fluid polymer encapsulation material,
   providing a vacuum dehydration unit, and
   emplacement of said droplets of said precursor material in said shell of middle fluid polymer encapsulation material in said vacuum dehydration unit where said precursor material is transformed into a solid.

2. The method of making a capsule containing an encapsulated material of claim 1 wherein said step of emplacement of said droplets of said precursor material in said shell of middle fluid polymer encapsulation material in said vacuum dehydration unit comprises emplacement of said droplets of said concentrated sodium carbonate solution precursor material in said shell of middle fluid polymer encapsulation material in said vacuum dehydration unit where said precursor material is transformed into a polymer-coated sodium carbonate solid.

\* \* \* \* \*